US012643077B2

(12) United States Patent
Belmont et al.

(10) Patent No.: US 12,643,077 B2
(45) Date of Patent: Jun. 2, 2026

(54) DIETHYLAMINO ETHYL POLYMERS AND METHODS OF USE

(71) Applicant: Cytiva US LLC, Marlborough, MA (US)

(72) Inventors: James Belmont, Westborough, MA (US); Hassan Ait-Haddou, Pensacola, FL (US); Jacqueline Blue, Pensacola, FL (US); Somnath Bhattacharjee, Pensacola, FL (US); Diego Amado Torres, Pensacola, FL (US)

(73) Assignee: Cytiva US LLC, Marlborough, MA (US)

( * ) Notice: Subject to any disclaimer, the term of this patent is extended or adjusted under 35 U.S.C. 154(b) by 339 days.

(21) Appl. No.: 18/238,802

(22) Filed: Aug. 28, 2023

(65) Prior Publication Data

US 2025/0073647 A1 Mar. 6, 2025

(51) Int. Cl.

| | |
|---|---|
| ***B01D 71/56*** | (2006.01) |
| ***B01D 67/00*** | (2006.01) |
| ***C08J 5/22*** | (2006.01) |

(52) U.S. Cl.

CPC ......... *B01D 71/56* (2013.01); *B01D 67/0006* (2013.01); *C08J 5/2206* (2013.01)

(58) Field of Classification Search

None

See application file for complete search history.

(56) References Cited

U.S. PATENT DOCUMENTS

| | | | | |
|---|---|---|---|---|
| 7,015,281 | B2 | 3/2006 | Britsch et al. | |
| 9,033,159 | B1 | 5/2015 | Husson et al. | |
| 9,199,203 | B2 | 12/2015 | Yin | |
| 10,981,122 | B2 * | 4/2021 | Hoshino ............ | B01D 71/4011 |
| 2020/0047086 | A1 | 2/2020 | Zhou | |

* cited by examiner

*Primary Examiner* — Krishnan S Menon

(74) *Attorney, Agent, or Firm* — Leydig, Voit & Mayer, Ltd.

(57) ABSTRACT

The invention provides a porous medium comprising (i) a porous support and (ii) a polymer or a salt thereof comprising at least one polymerized monomer (A), optionally at least one polymerized monomer (B), and optionally at least one polymerized monomer (C), wherein monomers (A)-(C) are as defined herein, and wherein the polymer or a salt thereof is crosslinked with a crosslinking agent to form a crosslinked polymer or a salt thereof as a network on the porous support. The invention also provides a method of making the porous medium and a method of using the porous medium.

9 Claims, 2 Drawing Sheets

DIETHYLAMINO ETHYL POLYMERS AND METHODS OF USE

BACKGROUND OF THE INVENTION

Production and purification of biomaterials such as biopolymers, lipids, carbohydrates, peptides, proteins, antibodies, nucleotides, bacteria, and viruses can be a costly process due to difficulties associated with isolation of a pure sample. With the biotechnology market rapidly growing, improvements in these purification steps are becoming more desirable and more valuable in bringing biomaterials to the market in a timely space and at reduced cost. Thus, there remains a need for materials that can be used to purify and/or isolate desirable biomaterials.

The invention provides such materials and methods of purifying biomaterials. These and other advantages of the invention, as well as additional inventive features, will be apparent from the description of the invention provided herein.

BRIEF SUMMARY OF THE INVENTION

The invention provides a porous medium comprising (i) a porous support and (ii) a polymer or a salt thereof comprising at least one polymerized monomer (A), optionally at least one polymerized monomer (B), and optionally at least one polymerized monomer (C), wherein monomer (A) is of formula (I):

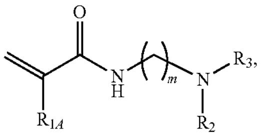

monomer (B) is of formula (II):

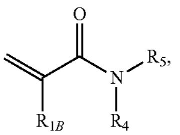

and monomer (C) is of formula (III):

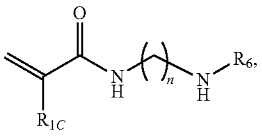

wherein

- $R_{1A}$, $R_{1B}$, and $R_{1C}$ are each independently hydrogen or methyl,
- $R_2$ and $R_3$ are each independently a $C_{1-5}$ alkyl group, a $C_{1-5}$ heteroalkyl group, or $R_2$ and
- $R_3$ are combined to form a 5- or 6-membered ring containing 3 to 5 carbon atoms,
- $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof,
- $R_6$ is hydrogen, a substituted or unsubstituted $C_{1-8}$ alkyl group, aryl group, heteroaryl group, an alkaryl group, an arylalkyl group, or a combination thereof,
- m and n are each independently an integer from 1 to 4,
- wherein the polymer or a salt thereof is cross-linked with a crosslinking agent to form a network on the porous support.

The invention also provides a method of making a porous medium described herein, the method comprising:

(i) polymerizing a monomer mixture comprising at least one monomer (A) of Formula (I), optionally at least one monomer (B) of Formula (II), and optionally at least one monomer (C) of Formula (III) to obtain a polymer or salt thereof comprising at least one polymerized monomer (A), optionally at least one polymerized monomer (B), and optionally at least one polymerized monomer (C) and (ii) crosslinking the polymer or a salt thereof with a crosslinking agent to form a crosslinked polymer or a salt thereof as a network on the porous support.

The invention further provides a method of purifying a solution comprising a biomaterial, the method comprising contacting the solution with a porous medium.

DETAILED DESCRIPTION OF THE INVENTION

Figure 1:
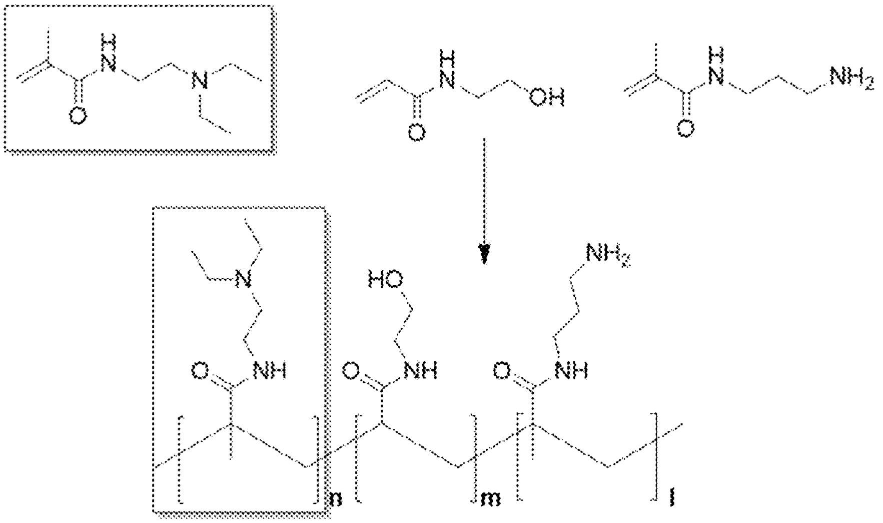
FIG. 1 shows the preparation of an exemplary polymer described herein.

The invention provides a porous medium comprising (i) a porous support and (ii) a polymer or a salt thereof comprising at least one polymerized monomer (A), optionally at least one polymerized monomer (B), and optionally at least one polymerized monomer (C), wherein monomer (A) is of formula (I):

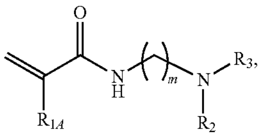

monomer (B) is of formula (II):

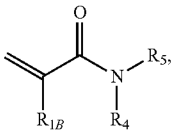

and monomer (C) is of formula (III):

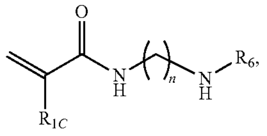

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

In some embodiments, the porous medium comprises (i) a porous support and (ii) a polymer or a salt thereof comprising at least one polymerized monomer (A), at least one polymerized monomer (B), and optionally at least one polymerized monomer (C), wherein monomer (A) is of formula (I):

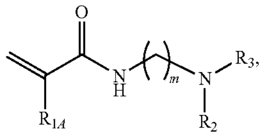

monomer (B) is of formula (II):

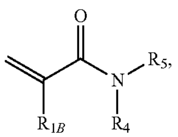

and monomer (C) is of formula (III):

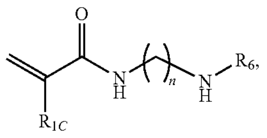

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

In some embodiments, the porous medium comprises (i) a porous support and (ii) a polymer or a salt thereof comprising at least one polymerized monomer (A), optionally at least one polymerized monomer (B), and at least one polymerized monomer (C), wherein monomer (A) is of formula (I):

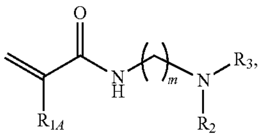

monomer (B) is of formula (II):

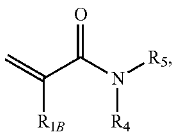

and monomer (C) is of formula (III):

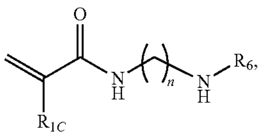

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

In certain embodiments, the porous medium comprises (i) a porous support and (ii) a polymer or a salt thereof comprising at least one polymerized monomer (A), at least one polymerized monomer (B), and at least one polymerized monomer (C), wherein monomer (A) is of formula (I):

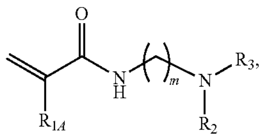

monomer (B) is of formula (II):

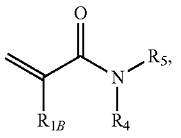

and monomer (C) is of formula (III):

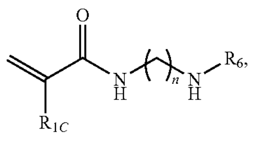

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

The porous medium can be any suitable medium (e.g., beads, fibers, membranes, etc.) in which liquid can pass through. Generally, the porous medium comprises (i) a porous support and (ii) a polymer or a salt thereof, wherein the polymer or a salt thereof is crosslinked with a crosslinking agent to form a network on the porous support.

The porous support can be any suitable material or macromolecule capable of attaching a polymer described herein thereto. For example, the porous support can be a membrane (e.g., a porous membrane or a microporous membrane), or a fibrous medium, a bead (e.g., a polymeric bead), or a filter. In certain embodiments, the porous support comprises polystyrene, polyethersulfone, polysulfone, polyethylene (e.g., high density polyethylene), or a combination thereof.

The porous medium can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the porous medium.

The porous medium can have any suitable average pore diameter. For example, the porous medium can have an average pore diameter of 0.1 nm or more, 0.5 nm or more, 1 nm or more, 2 nm or more, 5 nm or more, 10 nm or more, 50 nm or more, or 100 nm or more. Alternatively, or additionally, the porous medium can have an average pore diameter of 10 μm or less, for example, 5 μm or less, 2 μm or less, 1 μm or less, 500 nm or less, or 100 nm or less. Thus, the porous medium can have an average pore diameter bounded by any two of the aforementioned endpoints. For example, the porous medium can have an average pore diameter of 0.1 nm to 10 μm, 0.1 nm to 5 μm, 0.1 nm to 2 μm, 0.1 nm to 1 μm, 0.1 nm to 500 nm, 0.1 nm to 100 nm, 0.5 nm to 10 μm, 0.5 nm to 5 μm, 0.5 nm to 2 μm, 0.5 nm to 1 μm, 0.5 nm to 500 nm, 0.5 nm to 100 nm, 1 nm to 10 μm, 1 nm to 5 μm, 1 nm to 2 μm, 1 nm to 1 μm, 1 nm to 500 nm, 1 nm to 100 nm, 2 nm to 10 μm, 2 nm to 5 μm, 2 nm to 2 μm, 2 nm to 1 μm, 2 nm to 500 nm, 2 nm to 100 nm, 5 nm to 10 μm, 5 nm to 5 μm, 5 nm to 2 μm, 5 nm to 1 μm, 5 nm to 500 nm, 5 nm to 100 nm, 10 nm to 10 μm, 10 nm to 5 μm, 10 nm to 2 μm, 10 nm to 1 μm, 10 nm to 500 nm, 10 nm to 100 nm, 50 nm to 10 μm, 50 nm to 5 μm, 50 nm to 2 μm, 50 nm to 1 μm, 50 nm to 500 nm, 50 nm to 100 nm, 100 nm to 10 μm, 100 nm to 5 μm, 100 nm to 2 μm, 100 nm to 1 μm, or 100 nm to 500 nm.

In some embodiments, the polymer does not significantly impact the pore structure of the porous support. For example, the porous medium can have an average pore diameter that is within about 30% (e.g., within about 25%, within about 20%, within about 15%, within about 10%, or within about 5%) of the average pore diameter of the porous support.

The polymer can be any suitable polymer comprising at least one polymerized monomer (A), wherein monomer (A) is of formula (I):

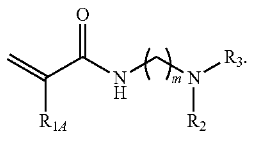

In monomer (A) of formula (I), $R_{1A}$ is hydrogen or methyl, $R_2$ and $R_3$ are each independently a $C_{1-5}$ alkyl group (e.g., methyl, ethyl, propyl, butyl, or pentyl), a $C_{1-5}$ heteroalkyl group, or $R_2$ and $R_3$ are combined to form a 5- or 6-membered ring containing 3 to 5 carbon atoms (e.g., piperidinyl, morpholinyl, pyridinyl, pyrrolidinyl, piperazinyl, imidazoyl, oxazoyl, isoxazoyl, thiazoyl, pyrazoyl, etc.), and m and n are each independently an integer from 1 to 4 (i.e., 1, 2, 3, or 4). In some embodiments, $R_2$ and $R_3$ are each a $C_{1-5}$ alkyl group (e.g., methyl, ethyl, propyl, butyl, or pentyl). In some embodiments, at least one of $R_2$ and $R_3$ is a $C_{1-5}$ heteroalkyl group. In certain embodiments, $R_2$ and $R_3$ are combined to form a 5- or 6-membered ring containing 3 to 5 carbon atoms such as piperidinyl, morpholinyl, pyridinyl, pyrrolidinyl, piperazinyl, imidazoyl, oxazoyl, isoxazoyl, thiazoyl, or pyrazoyl.

Exemplary monomer (A) monomers include, but are not limited to, the following;

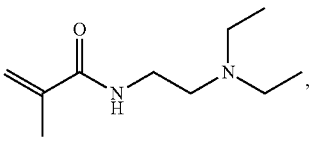

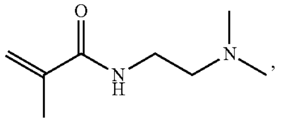

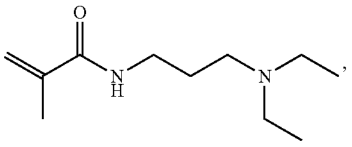

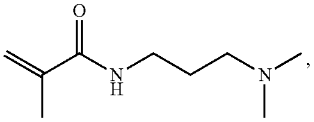

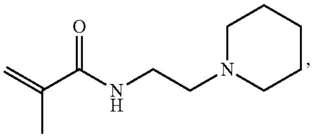

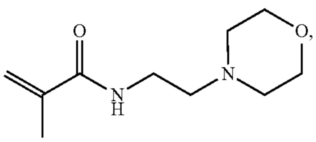

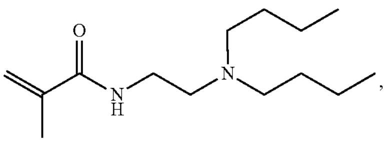

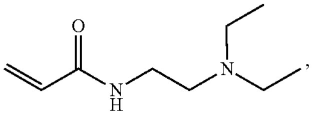

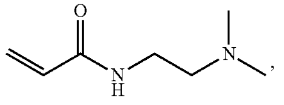

-continued

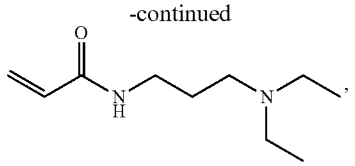

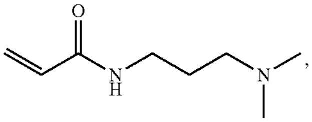

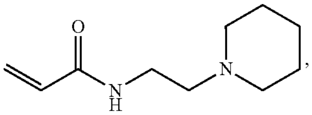

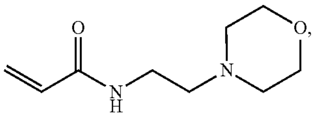

and

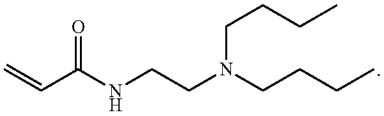

In some embodiments, the polymer comprises a monomer (A) selected from diethylaminoethyl (meth)acrylamide, dimethylaminoethyl (meth)acrylamide, dibutylaminoethyl (meth)acrylamide, piperidinylethyl (meth)acrylamide, morpholinoethyl (meth)acrylamide, diethylaminoethyl acrylamide, dimethylaminoethyl acrylamide, dibutylaminoethyl acrylamide, piperidinylethyl acrylamide, morpholinoethyl acrylamide, and a combination thereof. In certain embodiments, the polymer comprises diethylaminoethyl (meth) acrylamide and/or diethylaminoethyl acrylamide. In certain embodiments of the porous medium, described herein, each polymer is 10 mol % to 90 mol % polymerized monomer (A).

The polymer can comprise any suitable amount of polymerized monomer (A). In some embodiments, the polymer comprises about 10 mol % or more of polymerized monomer (A) based on the sum total of monomers (A), (B), and (C), for example, about 20 mol % or more, about 30 mol % or more, about 40 mol % or more, about 50 mol % or more, about 60 mol % or more, about 70 mol % or more, about 80 mol % or more, about 90 mol % or more, or about 95 mol % or more of polymerized monomer (A) based on the sum total of monomers (A), (B), and (C). Alternatively, or in addition, the polymer comprises about 100 mol % or less of polymerized monomer (A) based on the sum total of monomers (A), (B), and (C), for example, about 95 mol % or less, about 90 mol % or less, about 80 mol % or less, about 70 mol % or less, or about 60 mol % or less of polymerized monomer (A) based on the sum total of monomers (A), (B), and (C). Thus, polymerized monomer (A) can be present in the polymer at a concentration bounded by any two of the aforementioned endpoints. For example, the polymer can comprise about 10 mol % to about 100 mol % of polymerized monomer (A) based on the sum total of monomers (A), (B), and (C), for example, about 10 mol % to about 95 mol %, about 10 mol % to about 90 mol %, about 10 mol % to about 80 mol %, about 10 mol % to about 70 mol %, about 10 mol % to about 60 mol %, about 20 mol % to about 100 mol %, about 20 mol % to about 95 mol %, about 20 mol % to about 90 mol %, about 20 mol % to about 80 mol %, about 20 mol % to about 70 mol %, about 20 mol % to about 60 mol %, about 30 mol % to about 100 mol %, about 30 mol % to about 95 mol %, about 30 mol % to about 90 mol %, about 30 mol % to about 80 mol %, about 30 mol % to about 70 mol %, about 30 mol % to about 60 mol %, about 40 mol % to about 100 mol %, about 40 mol % to about 95 mol %, about 40 mol % to about 90 mol %, about 40 mol % to about 80 mol %, about 40 mol % to about 70 mol %, or about 40 mol % to about 60 mol % of polymerized monomer (A) based on the sum total of monomers (A), (B), and (C). In an embodiment, the polymer comprises 100% polymerized monomer (A). In some embodiments, the polymer comprises 10 mol % to 90 mol % polymerized monomer (A). In certain embodiments, the polymer comprises 40 mol % to 60 mol % polymerized monomer (A).

In some embodiments, the polymer further comprises at least one polymerized monomer (B), wherein monomer (B) is of formula (II):

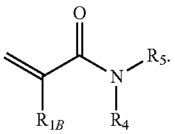

In monomer (B) of formula (II), $R_{1B}$ is hydrogen or methyl and $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof. In certain embodiments, $R_4$ and $R_5$ are each independently hydrogen, a substituted or unsubstituted $C_{1-8}$ alkyl group (e.g., $C_{1-8}$ hydroxyalkyl), $C_{1-8}$ heteroalkyl group, $C_{3-8}$ cycloalkyl group, aryl group, an alkaryl group, an arylalkyl group, or a combination thereof.

Exemplary monomer (B) monomers include, but are not limited to, the following;

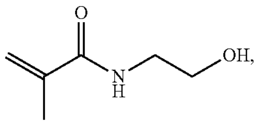 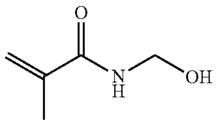 ,

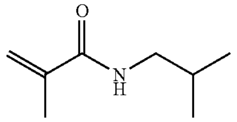 , 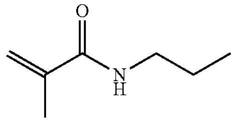 ,

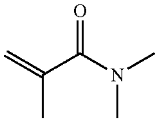 , 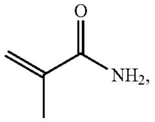

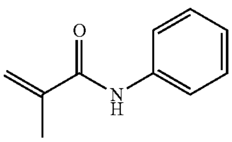 , 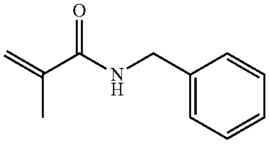 ,

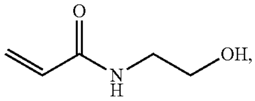 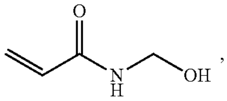 ,

-continued

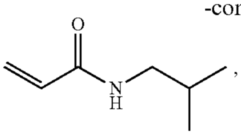 , 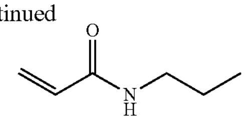 ,

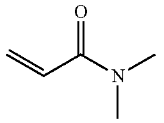 , 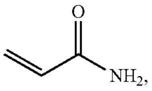

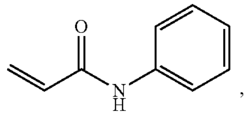 , and

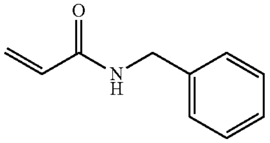 .

In some embodiments the polymer comprises a monomer (B) selected from hydroxyethyl (meth)acrylamide, hydroxymethyl (meth)acrylamide, isobutyl (meth)acrylamide, propyl (meth)acrylamide, dimethyl (meth)acrylamide, (meth)acrylamide, benzyl (meth)acrylamide, phenyl (meth) acrylamide, hydroxyethyl acrylamide, hydroxymethyl acrylamide, isobutyl acrylamide, propyl acrylamide, dimethyl acrylamide, acrylamide, benzyl acrylamide, phenyl acrylamide, and a combination thereof. In certain embodiments, the polymer comprises hydroxyethyl (meth)acrylamide and/or hydroxyethyl acrylamide.

The polymer can comprise any suitable amount of polymerized monomer (B). In some embodiments, the polymer comprises about 0 mol % or more of polymerized monomer (B) based on the sum total of monomers (A), (B), and (C), for example, about 5 mol % or more, about 10 mol % or more, about 20 mol % or more, or about 30 mol % or more of polymerized monomer (B) based on the sum total of monomers (A), (B), and (C). Alternatively, or in addition, the polymer comprises about 85 mol % or less of polymerized monomer (B) based on the sum total of monomers (A), (B), and (C), for example, about 80 mol % or less, about 70 mol % or less, about 60 mol % or less, about 50 mol % or less, or about 40 mol % or less of polymerized monomer (B) based on the sum total of monomers (A), (B), and (C). Thus, polymerized monomer (B) can be present in the polymer at a concentration bounded by any two of the aforementioned endpoints. For example, the polymer can comprise about 0 mol % to about 85 mol % of polymerized monomer (B) based on the sum total of monomers (A), (B), and (C), for example, about 0 mol % to about 80 mol %, about 0 mol % to about 70 mol %, about 0 mol % to about 60 mol %, about 0 mol % to about 50 mol %, about 0 mol % to about 40 mol %, about 5 mol % to about 80 mol %, about 5 mol % to about 70 mol %, about 5 mol % to about 60 mol %, about 5 mol % to about 50 mol %, about 5 mol % to about 40 mol %, about 10 mol % to about 80 mol %, about 10 mol % to about 70 mol %, about 10 mol % to about 60 mol %, about 10 mol % to about 50 mol %, about 10 mol % to about 40 mol %, about 20 mol % to about 80 mol %, about 20 mol % to about 70 mol %, about 20 mol % to about 60 mol %, about 20 mol % to about 50 mol %, about 20 mol % to about 40 mol %, about 30 mol % to about 80 mol %, about 30 mol % to about 70 mol %, about 30 mol % to about 60 mol %, about 30 mol % to about 50 mol %, about 30 mol % to about 40 mol % of polymerized monomer (B) based on the sum total of monomers (A), (B), and (C). In an embodiment, the polymer comprises 0% polymerized monomer (B). In some embodiments, the polymer comprises 5 mol % to 85 mol % polymerized monomer (B). In certain embodiments, the polymer comprises 30 mol % to 50 mol % polymerized monomer (B).

In some embodiments, the polymer further comprises at least one polymerized monomer (C), wherein monomer (C) is of formula (III):

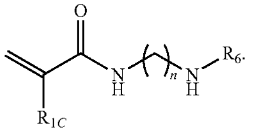

In monomer (C) of formula (III), $R_{1C}$ is hydrogen or methyl, $R_6$ is hydrogen, a substituted or unsubstituted $C_{1-8}$ alkyl group, aryl group, heteroaryl group, an alkaryl group, an arylalkyl group, or a combination thereof, and n is an integer from 1 to 4 (i.e., 1, 2, 3, or 4). In certain embodiments, $R_6$ is hydrogen or a substituted or unsubstituted $C_{1-8}$ alkyl group.

Exemplary monomer (C) monomers include, but are not limited to, the following;

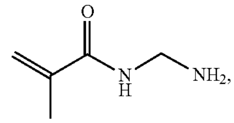, 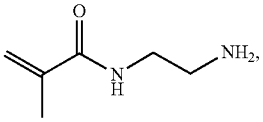, 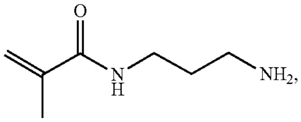, 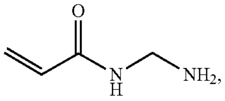, 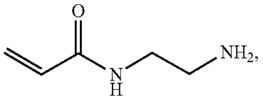, and 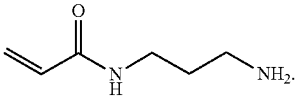.

In some embodiments the polymer comprises a monomer (C) selected from aminomethyl (meth)acrylamide, aminoethyl (meth)acrylamide, aminopropyl (meth)acrylamide, aminomethyl acrylamide, aminoethyl acrylamide, aminopropyl acrylamide, and a combination thereof. In certain embodiments, the polymer comprises aminopropyl (meth) acrylamide and/or aminopropyl acrylamide.

The polymer can comprise any suitable amount of polymerized monomer (C). In some embodiments, the polymer comprises about 0 mol % or more of polymerized monomer (C) based on the sum total of monomers (A), (B), and (C), for example, about 1 mol % or more, about 5 mol % or more, about 10 mol % or more, or about 20 mol % or more of polymerized monomer (C) based on the sum total of monomers (A), (B), and (C). Alternatively, or in addition, the polymer comprises about 85 mol % or less of polymerized monomer (C) based on the sum total of monomers (A), (B), and (C), for example, about 80 mol % or less, about 70 mol % or less, about 60 mol % or less, about 50 mol % or less, about 40 mol % or less, about 30 mol % or less, or about 20 mol % or less of polymerized monomer (C) based on the sum total of monomers (A), (B), and (C). Thus, polymerized monomer (C) can be present in the polymer at a concentration bounded by any two of the aforementioned endpoints. For example, the polymer can comprise about 0 mol % to about 85 mol % of polymerized monomer (C) based on the sum total of monomers (A), (B), and (C), for example, about 0 mol % to about 80 mol %, about 0 mol % to about 70 mol %, about 0 mol % to about 60 mol %, about 0 mol % to about 50 mol %, about 0 mol % to about 40 mol %, about 0 mol % to about 30 mol %, about 0 mol % to about 20 mol %, about 1 mol % to about 80 mol %, about 1 mol % to about 70 mol %, about 1 mol % to about 60 mol %, about 1 mol % to about 50 mol %, about 1 mol % to about 40 mol %, about 1 mol % to about 30 mol %, about 1 mol % to about 20 mol %, about 5 mol % to about 80 mol %, about 5 mol % to about 70 mol %, about 5 mol % to about 60 mol %, about 5 mol % to about 50 mol %, about 5 mol % to about 40 mol %, about 5 mol % to about 30 mol %, about 5 mol % to about 20 mol %, about 10 mol % to about 80 mol %, about 10 mol % to about 70 mol %, about 10 mol % to about 60 mol %, about 10 mol % to about 50 mol %, about 10 mol % to about 40 mol %, about 10 mol % to about 30 mol %, or about 10 mol % to about 20 mol % of polymerized monomer (C) based on the sum total of monomers (A), (B), and (C). In an embodiment, the polymer comprises 0% polymerized monomer (C). In some embodiments, the polymer comprises 1 mol % to 85 mol % polymerized monomer (C). In certain embodiments, the polymer comprises 1 mol % to 20 mol % polymerized monomer (C).

In some embodiments, the polymer comprises at least one polymerized monomer (A), at least one polymerized monomer (B), and at least one polymerized monomer (C). In embodiments where the polymer comprises at least one polymerized monomer (A), at least one polymerized monomer (B), and at least one polymerized monomer (C), $R_{1A}$, $R_{1B}$, and $R_{1C}$ are each independently hydrogen or methyl. For example, $R_{1A}$ can be hydrogen or methyl, $R_{1B}$ can be hydrogen or methyl, and $R_{1C}$ hydrogen or methyl. In certain embodiments, $R_{1A}$, $R_{1B}$, and $R_{1C}$ are hydrogen. In other embodiments, $R_{1A}$, $R_{1B}$, and $R_{1C}$ are methyl. In embodiments where the polymer comprises at least one polymerized monomer (A), at least one polymerized monomer (B), and at least one polymerized monomer (C), the polymer can comprises polymerized monomers (A), (B), and (C) in any suitable combination of mole percent described herein. In some embodiments, the polymer comprises 40 mol % to 60 mol % polymerized monomer (A), 30 mol % to 50 mol % polymerized monomer (B), and 1 mol % to 20 mol % polymerized monomer (C) based on the sum total of monomers (A), (B), and (C).

As used herein, the term "alkyl group" refers to a saturated hydrocarbon group, having the specified number of carbon atoms, usually from 1 to about 5 or 1 to about 8 carbon atoms. Examples of alkyl groups include methyl, ethyl, propyl (e.g., isopropyl or n-propyl), butyl (e.g., isobutyl, n-butyl, tert-butyl, or sec-butyl), pentyl, hexyl, heptyl, or octyl.

As used herein, the term "alkenyl group" refers to an alkyl group described herein comprising at least one unsaturated double bond, and having the specified number of carbon atoms, usually from 2 to about 5 or 2 to about 8 carbon atoms.

As used herein, the term "alkynyl group" refers to an alkyl group described herein comprising at least one unsaturated triple bond, and having the specified number of carbon atoms, usually from 2 to about 5 or 2 to about 8 carbon atoms.

As used herein, the term “heteroalkyl group” refers to an alkyl group described herein further containing from 1 to about 3 heteroatoms chosen from N, O, and S, with remaining substituent atoms being carbon, usually from about 1 to about 5 or 1 to about 8 carbon atoms. Examples of heteroalkyl groups are alkoxy groups, ethereal groups, thioalkyl groups, or thioethereal groups.

As used herein, the term “cycloalkyl group” refers to a saturated hydrocarbon ring group, having the specified number of carbon atoms, usually from 3 to about 8 carbon atoms. Examples of cycloalkyl groups include cyclopropyl, cyclobutyl, cyclopentyl, or cyclohexyl.

As used herein, the term “heterocyclyl group” refers to a cycloalkyl group, described herein, containing from 1 to about 3 heteroatoms chosen from N, O, and S, with remaining ring atoms being carbon. Examples of heterocyclyl groups include piperazine groups, furan groups, thiazole groups and the like.

As used herein, the term “aryl group” refers to a stable monocyclic or polycyclic, substituted or unsubstituted aromatic ring having 5 to 60 ring carbon atoms, e.g., phenyl, tolyl, xylyl, naphthyl, phenanthryl, and anthracenyl.

As used herein, the term “heteroaryl group” refers to a stable monocyclic aromatic ring having the indicated number of ring atoms which contains from 1 to 3, or in some aspects, from 1 to 2, heteroatoms chosen from N, O, and S, with remaining ring atoms being carbon, or a stable bicyclic or tricyclic system containing at least one 5- to 7-membered aromatic ring which contains from 1 to 3, or in some aspects, from 1 to 2, heteroatoms chosen from N, O, and S, with remaining ring atoms being carbon. Monocyclic heteroaryl groups typically have from 5 to 7 ring atoms, in some aspects, bicyclic heteroaryl groups are 9- to 10-membered heteroaryl groups, that is, groups containing 9 or 10 ring atoms in which one 5- to 7-member aromatic ring is fused to a second aromatic or non-aromatic ring. Exemplary heteroaryl groups include, but are not limited to, oxazolyl, piperazinyl, pyranyl, pyrazinyl, pyrazolopyrimidinyl, pyrazolyl, pyridizinyl, pyridyl, pyrimidinyl, pyrrolyl, quinolinyl, tetrazolyl, thiazolyl, thienylpyrazolyl, thiophenyl, triazolyl, henzofrijoxazolyl, benzofuranyl, benzothiazolyl, benzolhiophenyl, benzoxadiazolyl, dihydrobenzodioxynyl, furanyl, imidazolyl, indolyl, isothiazolyl, and isoxazolyl.

As used herein, the term “alkaryl group” refers to an aryl group or heteroaryl group being bound to the structure via an alkyl group or heteroalkyl group.

As used herein, the term “arylalkyl group” refers to an alkyl group or heteroalkyl group being bound to the structure via an aryl group or heteroaryl group.

All groups described herein can be substituted or unsubstituted. As used, herein, the term “substituted” refers to one or more hydrogen atoms in the substituent (i.e., group) being replaced with one or more groups selected from halo, hydroxy, amino, oxo (=O), alkylamino, amido, acyl, nitro, cyano, and alkoxy.

The polymer comprises polymerized versions of the monomer (A), optionally monomer (B), and optionally monomer (C). As used herein, the term “polymerized” when referring to a monomer described herein refers to the radical polymerization or addition polymerization thereof. In other words, the double bond of an unpolymerized monomer molecule reforms as a single bond to another monomer molecule ultimately producing a chain of linked monomer units. The term polymerized is further intended to include the process by which monomer units react to form polymer chains or networks. In certain embodiments, the polymerization comprises varying ratios of monomer (A), optionally monomer (B), and monomer (C). The resulting polymer can be in any suitable form, such as, for example, a block polymer, a random polymer, an alternating polymer, a graft polymer, or the like. Polymerization of the monomers can be carried out by using suitable initiator. For example, the polymerization can be carried out by using a free radical initiator, a cationic initiator, or an anionic initiator. Generally, the polymerization is performed using a free radical initiator such as, for example, thermally activated free radical initiators. Exemplary free radical initiators include azo compounds, persulfates, peroxides, peracids, peracetates, and organometallics. In some embodiments, the polymerization is carried out by using an initiator selected from AIBN, 4,4-azobis(4-cyanovaleric acid), 1,1'-azobis(cyclohexanecarbonitrile), benzoyl peroxide, 2,2-bis(tert-butylperoxy)butane, 1,1-bis(tert-butylperoxy)cyclohexane, 2,2'-azobis(2-methylpropionamidine)dihydrochloride, dicumylperoxie, tert-butyl peroxybenzoate, tert-amyl peroxybenzoate, ammonium persulfate, sodium persulfate, and potassium persulfate.

The polymer can have any suitable weight average molecular weight. Typically, the polymer has a weight average molecular weight of less than 1000 kDa prior to crosslinking to allow the porous membrane, described herein, to have an adequate biomaterial (e.g., bovine serum albumin (BSA)) binding capacity. For example, the polymer can have a weight average molecular weight of 50 kDa to 1000 kDa, 100 kDa to 1000 kDa, 200 kDa to 1000 kDa, 300 kDa to 1000 kDa, 400 kDa to 1000 kDa, 500 kDa to 1000 kDa, 50 kDa to 800 kDa, 100 kDa to 800 kDa, 200 kDa to 800 kDa, 300 kDa to 800 kDa, 400 kDa to 800 kDa, 500 kDa to 800 kDa, 50 kDa to 600 kDa, 100 kDa to 600 kDa, 200 kDa to 600 kDa, 300 kDa to 600 kDa, 400 kDa to 600 kDa, 500 kDa to 600 kDa, 50 kDa to 500 kDa, 100 kDa to 500 kDa, 200 kDa to 500 kDa, 300 kDa to 500 kDa, or 400 kDa to 500 kDa. In some embodiments, the polymer has a weight average molecular weight of 200 kDa to 1000 kDa prior to crosslinking. In some embodiments, the polymer has a weight average molecular weight of 300 kDa to 600 kDa prior to crosslinking. In some embodiments, the polymer has a weight average molecular weight of 400 kDa to 500 kDa prior to crosslinking.

The polymer or a salt thereof is crosslinked with a crosslinking agent to form a network on the porous support. As used herein, the terms “crosslinked” and “crosslinking” refers to the process of forming a polymeric network comprising a polymer described herein. The polymeric network may be a network on the porous support. For example, the porous support can be coated (e.g., dip-coated, roller coated, spray coated, powder coated, or formulated with the polymer solution) with the polymer (e.g., a polymeric solution) and subsequently cured to form a network on the porous support. Alternatively, the porous support can be coated (e.g., dip-coated, roller coated, spray coated, powder coated, or formulated with the polymeric network) with the polymeric network (e.g., a polymeric network solution) and subsequently cured to form a network on the porous support. Thus, the terms “crosslinked” and “crosslinking” can also refer to the process of forming a network on the porous support.

The crosslinking agent can be any suitable chemical moiety capable of crosslinking the polymer to form a polymeric network on the porous support. Generally, the crosslinking agent is an organic compound that crosslinks the polymer or salt thereof to form a network on the porous support. In some embodiments, the crosslinking agent is a polyfunctional agent comprising two, three, or more groups selected from epoxide, aldehyde, halide, acid, and ester. For example, the crosslinking agent can be ethylene glycol diglycidyl ether, propylene glycol diglycidyl ether, glyceryl triglycidyl ether, polyethylene glycol diglycidyl ether, glycol di- or poly-mesylate ester (e.g., ethylene glycol dimesylate ester, propylene glycol dimesylate ester, and glycerol trimesylate ester), glycol di- or tritosylate ester (e.g., ethylene glycol ditosylate ester, propylene glycol ditosylate ester, and glycerol tritosylate ester), glycol di- or tri-chlorides (e.g., ethylene glycol dichloride, propylene glycol dichloride, and glycerol trichloride), or any combination thereof. In some embodiments, the crosslinking agent is a propylene glycol diglycidyl ether, a glyceryl triglycidyl ether, a polyethylene glycol diglycidyl ether, a glycol dimesylate ester, a ditosylate ester, or any combination thereof. In certain embodiments, the crosslinking agent is a propylene glycol diglycidyl ether or a polyethylene glycol diglycidyl ether.

In some embodiments, the porous medium has a positively charged (i.e., cationic) surface. Typically, when the porous medium is positively charged (i.e., cationic), the positive charge is the result of one or more amines of polymerized monomers (A), (B), and (C) of the polymer being quaternized. In some embodiments, when the porous medium is positively charged (i.e., cationic), the positive charge is the result of one or more amines of polymerized monomer (A) of the polymer being quaternized. As used herein, the term "quaternized" refers to the nitrogen atom having a total of four covalent bonds, resulting in the formation of a cationic charge on the nitrogen atom.

The one or more amines of polymerized monomers (A), (B), and (C) of the polymer can be quaternized by any suitable means. In some embodiments, the one or more amines of polymerized monomers (A), (B), and (C) are quaternized during the curing process, e.g., quaternized with the crosslinking agent. Alternatively, or additionally, the one or more amines of polymerized monomers (A), (B), and (C) are quaternized with a quaternizing agent. The quaternizing agent can be any organic compound capable of reacting with an amine to form a quaternary amine. In some embodiments, the quaternizing agent is a glycidyl ether such as, for example, isopropyl glycidyl ether, phenyl glycidyl ether, tert-butyl glycidyl ether, ethylhexyl glycidyl ether, glycidyl methyl ether, and benzyl glycidyl ether.

The invention also provides a method of making a material described herein, the method comprising (i) polymerizing a monomer mixture comprising at least one monomer (A) of Formula (I), optionally at least one monomer (B) of Formula (II), and optionally at least one monomer (C) of Formula (III) to obtain a polymer or salt thereof comprising at least one polymerized monomer (A), optionally at least one polymerized monomer (B), and optionally at least one polymerized monomer (C) and (ii) crosslinking the polymer or a salt thereof with a crosslinking agent to form a cross-linked polymer or a salt thereof as a network on the porous support. In some embodiments, the method comprises (i) polymerizing a monomer mixture comprising at least one monomer (A) of Formula (I), at least one monomer (B) of Formula (II), and optionally at least one monomer (C) of Formula (III) to obtain a polymer or salt thereof comprising at least one polymerized monomer (A), at least one polymerized monomer (B), and optionally at least one polymerized monomer (C) and (ii) crosslinking the polymer or a salt thereof with a crosslinking agent to form a cross-linked polymer or a salt thereof and binding the cross-linked polymer or a salt thereof as a network on the porous support. In some embodiments, the method comprises (i) polymerizing a monomer mixture comprising at least one monomer (A) of Formula (I), optionally at least one monomer (B) of Formula (II), and at least one monomer (C) of Formula (III) to obtain a polymer or salt thereof comprising at least one polymerized monomer (A), optionally at least one polymerized monomer (B), and at least one polymerized monomer (C) and (ii) crosslinking the polymer or a salt thereof with a crosslinking agent to form a cross-linked polymer or a salt thereof as a network on the porous support. In certain embodiments, the method comprises polymerizing a monomer mixture comprising at least one monomer (A) of Formula (I), at least one monomer (B) of Formula (II), and at least one monomer (C) of Formula (III) to obtain a polymer or salt thereof comprising at least one polymerized monomer (A), at least one polymerized monomer (B), and at least one polymerized monomer (C) and (ii) crosslinking the polymer or a salt thereof with a crosslinking agent to form a cross-linked polymer or a salt thereof as a network on the porous support.

Monomer (A), optionally monomer (B), and optionally monomer (C) can be polymerized in a monomer mixture having any suitable pH. For example, the monomer mixture can have a pH of about 2 to about 12, about 3 to about 11, about 4 to about 10, about 4 to about 9, about 4 to about 8, about 4 to about 7.5, about 4 to about 7, about 4 to about 6.5, about 4 to about 6, about 5 to about 10, about 5 to about 9, about 5 to about 8, about 5 to about 7.5, about 5 to about 7, about 5 to about 6.5, or about 5 to about 6. In some embodiments, the monomer mixture has a pH of 4 to 7.5. In certain embodiments, the monomer mixture has a pH of 5 to 6.

The method comprises crosslinking the polymer or a salt thereof with a crosslinking agent to form a cross-linked polymer or a salt thereof as a network on the porous support. The cross-linked polymer can be formed by any suitable method. In some embodiments, the cross-linked polymer can be formed using a polymer solution containing the polymer or a salt thereof and the crosslinking agent. For example, the porous support can be coated (e.g., dip-coated, roller coated, spray coated, powder coated, or formulated with the polymer solution) with a polymer solution and subsequently cured to form the polymer network. The polymer solution can contain any suitable amount of the polymer or a salt thereof and the crosslinking agent. In some embodiments, the polymer solution comprises 1 (w/w) % to 10 (w/w) % of the polymer or a salt thereof and 0.1 (w/w) % to 1 (w/w) % of the crosslinking agent.

In some embodiments, the porous support is coated with the polymer solution. The porous support can be coated by any suitable means. For example, the porous support can be dip-coated, roller coated, spray coated, powder coated, or formulated with the polymer solution (or polymeric network solution) to form a coated porous support. In some embodiments, the porous medium is dip coated with the polymer solution (or polymeric network solution) to form a coated porous support.

In order to form the cross-linked polymer or a salt thereof bound as a network on the porous support, the coated porous support is cured. The coated porous support can be cured by any suitable means (e.g., light, heat, chemically, etc.). In some embodiments, the coated porous support is cured by elevated temperatures. For example, the porous support can be cured at a temperature of 50° C. to 200° C., 50° C. to 150° C., 50° C. to 100° C., 100° C. to 200° C., or 100° C. to 150° C. In some embodiments, the coated porous support is cured at a temperature of 50° C. to 150° C. to form a cured porous support. In certain embodiments, the coated porous support is cured at a temperature of 100° C. to 150° C. to form a cured porous support.

In some embodiments of the method of making a material described herein, the cured porous support is washed and/or dried to form the porous medium comprising the crosslinked polymer or a salt thereof thereon. The cured porous support can be washed using any suitable solution (e.g., wash buffer) and/or dried using any suitable method (e.g., by applying heat).

The invention further provides a method of purifying a solution comprising a biomaterial, the method comprising contacting the solution with a porous medium described herein. As used herein, the term "purifying" refers to the process of removing and/or separating biomaterials in solution to improve the purity or concentration of a desired biomaterial. In some embodiments, the method facilitates the isolation of a desired biomaterial in a pure state. The biomaterial can be purified (e.g., separated) from impurities such as unwanted byproducts, reagents, contaminants, or the like. Alternatively, or additionally, the biomaterial can be purified (e.g., separated) from other biomaterials. In some embodiments, the desired biomaterial has a stronger affinity for the porous medium described herein than the contaminant or unwanted biomaterial. In other embodiments, the desired biomaterial has a weaker affinity for the porous medium described herein than the contaminant or unwanted biomaterial.

As used herein, the term "biomaterial" refers to a natural, synthetic, or non-living substance or material that may interact with biological systems and/or have a biological use. The term "biomaterial" is intended to encompass a material or substance that may have been engineered to take a form which, alone or as part of a complex system, may be used to direct, by control of interactions with components of living systems, the course of any therapeutic of diagnostic procedure. The term "biomaterial" is further intended to include a material that is biocompatible with a human or animal body. For example, the biomaterial can be a biopolymer (e.g., a glycopolymer, a cellulosic polymer, etc.), a lipid (e.g., lipid vesicles, micelles, liposomes, etc.), a carbohydrate (e.g., sugar, starch, cellulose, glycogen, etc.), a peptide (e.g., a polypeptide, a protein, a peptide mimetic, a glycopeptide, etc.), an antibody construct (e.g., antibody, an antibody-derivative (including Fc fusions, Fab fragments and scFvs), etc.), a nucleotide (e.g., RNA, DNA, antisense, siRNA, an aptamer, etc.), a bacteria, a virus, or any combination thereof. In some embodiments, the biomaterial comprises lentivirus, AAV capsid, or plasmid DNA. In some embodiments, the method of purifying a solution comprising a biomaterial further comprises separating full AAV capsids from empty AAV capsids.

The method comprises contacting a solution comprising a biomaterial with a porous medium described herein. The solution comprising the biomaterial can be contacted with the porous medium by any suitable method. For example, the solution can be passed through the porous medium, the porous medium can be submerged in the solution, or the solution can be diffused through the porous medium. In some embodiments, the solution comprising the biomaterial is passed through the porous medium, for example, by using column chromatography or the like. The solution comprising the biomaterial can be passed through the porous medium using flow through mode (e.g., step elution and/or gradient elution) and/or bind and elute mode.

ASPECTS OF THE DISCLOSURE

Aspects, including embodiments, of the invention described herein may be beneficial alone or in combination, with one or more other aspects or embodiments. Without limiting the foregoing description, certain non-limiting aspects of the disclosure numbered 1-44 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

(1) In aspect (1) is presented a porous medium comprising (i) a porous support and (ii) a polymer or a salt thereof comprising at least one polymerized monomer (A), optionally at least one polymerized monomer (B), and optionally at least one polymerized monomer (C), wherein monomer (A) is of formula (I):

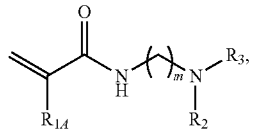

monomer (B) is of formula (II):

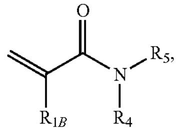

and monomer (C) is of formula (III):

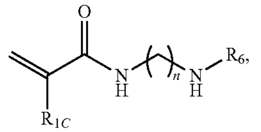

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

(2) In aspect (2) is presented the porous medium of aspect (1), wherein the polymer or a salt thereof comprises at least one polymerized monomer (A), at least one polymerized monomer (B), and optionally at least one polymerized monomer (C), wherein monomer (A) is of formula (I):

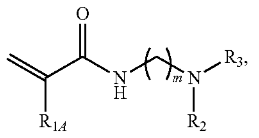

monomer (B) is of formula (II):

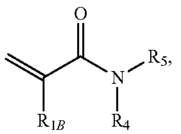

and monomer (C) is of formula (III):

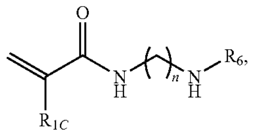

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

(3) In aspect (3) is presented the porous medium of aspect (1), wherein the polymer or a salt thereof comprises at least one polymerized monomer (A), optionally at least one polymerized monomer (B), and at least one polymerized monomer (C), wherein monomer (A) is of formula (I):

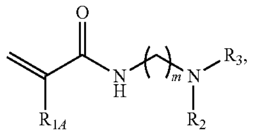

monomer (B) is of formula (II):

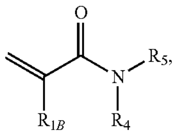

and monomer (C) is of formula (III):

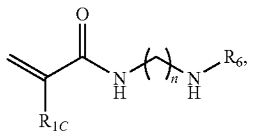

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

(4) In aspect (4) is presented the porous medium of aspect (1), wherein the polymer or a salt thereof comprises at least one polymerized monomer (A), at least one polymerized monomer (B), and at least one polymerized monomer (C), wherein monomer (A) is of formula (I):

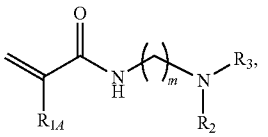

monomer (B) is of formula (II):

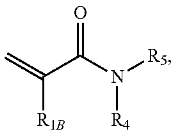

and monomer (C) is of formula (III):

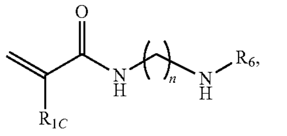

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$ are each independently hydrogen, a substituted or unsubstituted $C_{1-8}$ alkyl group (e.g., $C_{1-8}$ hydroxyalkyl), $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, an arylalkyl group, or a combination thereof, $R_6$ is hydrogen, a substituted or unsubstituted $C_{1-8}$ alkyl group, aryl group, heteroaryl group, an alkaryl group, an arylalkyl group, or a combination thereof, m and n are each independently an integer from 1 to 4, wherein the polymer or a salt thereof is crosslinked with a crosslinking agent to form a network on the porous support.

(5) In aspect (5) is presented the porous medium of any one of aspects (1)-(4), wherein each $R_{1A}$, $R_{1B}$, and $R_{1C}$ is hydrogen.

(6) In aspect (6) is presented the porous medium of any one of aspects (1)-(4), wherein each $R_{1A}$, $R_{1B}$, and $R_{1C}$ is methyl.

(7) In aspect (7) is presented the porous medium of any one of aspects (1)-(6), wherein each $R_2$ and $R_3$ independently is $C_{1-5}$ alkyl group.

(8) In aspect (8) is presented the porous medium of any one of aspects (1)-(7), wherein $R_4$ and $R_5$ are each independently hydrogen, a substituted or unsubstituted $C_{1-8}$ alkyl group (e.g., $C_{1-8}$ hydroxyalkyl), $C_{1-8}$ heteroalkyl group, $C_{3-8}$ cycloalkyl group, aryl group, an alkaryl group, an arylalkyl group, or a combination thereof.

(9) In aspect (9) is presented the porous medium of any one of aspects (1)-(8), wherein $R_6$ is hydrogen or a substituted or unsubstituted $C_{1-8}$ alkyl group.

(10) In aspect (10) is presented the porous medium of any one of aspects (1)-(9), wherein each polymer is 10 mol % to 90 mol % polymerized monomer (A).

(11) In aspect (11) is presented the porous medium of any one of aspects (1)-(10), wherein each polymer comprises 40 mol % to 60 mol % polymerized monomer (A).

(12) In aspect (12) is presented the porous medium of any one of aspects (1)-(11), wherein each polymer comprises 5 mol % to 85 mol % polymerized monomer (B).

(13) In aspect (13) is presented the porous medium of any one of aspects (1)-(12), wherein each polymer is 30 mol % to 50 mol % polymerized monomer (B).

(14) In aspect (14) is presented the porous medium of any one of aspects (1)-(13), wherein each polymer comprises 1 mol % to 85 mol % polymerized monomer (C).

(15) In aspect (15) is presented the porous medium of any one of aspects (1)-(14), wherein each polymer comprises 1 mol % to 20 mol % polymerized monomer (C).

(16) In aspect (16) is presented the porous medium of any one of aspects (1)-(15), wherein each porous support is a membrane, a resin, a bead, or a fiber.

(17) In aspect (17) is presented the porous medium of any one of aspects (1)-(16), wherein each porous medium is a positively charged surface.

(18) In aspect (18) is presented the porous medium of any one of aspect (17), wherein each amine of polymerized monomer (A) is quaternized to provide the positively charged surface.

(19) In aspect (19) is presented the porous medium of any one of aspects (1)-(18), wherein the crosslinking agent comprises propylene glycol diglycidyl ether, a glyceryl triglycidyl ether, a polyethylene glycol diglycidyl ether, a glycol dimesylate ester, a ditosylate ester, or any combination thereof.

(20) In aspect (20) is presented the porous medium of any one of aspect (19), wherein the crosslinking agent is a propylene glycol diglycidyl ether or a polyethylene glycol diglycidyl ether.

(21) In aspect (21) is presented the porous medium of any one of aspects (1)-(20), wherein each polymerized monomer (A) is diethylaminoethyl (meth)acrylamide.

(22) In aspect (22) is presented the porous medium of any one of aspects (1)-(21), wherein each polymer has a weight average molecular weight of 200 kDa to 1000 kDa.

(23) In aspect (23) is presented the porous medium of any one of aspects (1)-(22), wherein each polymer has a weight average molecular weight of 300 kDa to 600 kDa.

(24) In aspect (24) is presented the porous medium of any one of aspects (1)-(23), wherein each polymer has a weight average molecular weight of 400 kDa to 500 kDa.

(25) In aspect (25) is presented a method of preparing a porous medium of any one of aspects (1)-(24), the method comprising:

(i) polymerizing a monomer mixture comprising at least one monomer (A) of Formula (I), optionally at least one monomer (B) of Formula (II), and optionally at least one monomer (C) of Formula (III) to obtain a polymer or salt thereof comprising at least one polymerized monomer (A), optionally at least one polymerized monomer (B), and optionally at least one polymerized monomer (C) and (ii) crosslinking the polymer or a salt thereof with a crosslinking agent to form a crosslinked polymer or a salt thereof as a network on the porous support.

(26) In aspect (26) is presented the method of preparing a porous medium of aspect (25), the method comprising:

(iii) polymerizing a monomer mixture comprising at least one monomer (A) of Formula (I), at least one monomer (B) of Formula (II), and optionally at least one monomer (C) of Formula (III) to obtain a polymer or salt thereof comprising at least one polymerized monomer (A), at least one polymerized monomer (B), and optionally at least one polymerized monomer (C) and (iv) crosslinking the polymer or a salt thereof with a crosslinking agent to form a crosslinked polymer or a salt thereof as a network on the porous support.

(27) In aspect (27) is presented the method of preparing a porous medium of aspect (25), the method comprising:

(v) polymerizing a monomer mixture comprising at least one monomer (A) of Formula (I), optionally at least one monomer (B) of Formula (II), and at least one monomer (C) of Formula (III) to obtain a polymer or salt thereof comprising at least one polymerized monomer (A), optionally at least one polymerized monomer (B), and at least one polymerized monomer (C) and (vi) crosslinking the polymer or a salt thereof with a crosslinking agent to form a crosslinked polymer or a salt thereof as a network on the porous support.

(28) In aspect (28) is presented the method of preparing a porous medium of aspect (25), the method comprising:

(vii) polymerizing a monomer mixture comprising at least one monomer (A) of Formula (I), at least one monomer (B) of Formula (II), and at least one monomer (C) of Formula (III) to obtain a polymer or salt thereof comprising at least one polymerized monomer (A), at least one polymerized monomer (B), and at least one polymerized monomer (C) and (viii) crosslinking the polymer or a salt thereof with a crosslinking agent to form a crosslinked polymer or a salt thereof as a network on the porous support.

(29) In aspect (29) is presented the method of any one of aspects (25)-(28), wherein the monomer mixture has a pH of 4 to 7.5.

(30) In aspect (30) is presented the method of any one of aspects (25)-(29), wherein the monomer mixture has a pH of 5 to 6.

(31) In aspect (31) is presented the method of any one of aspects (25)-(30), wherein crosslinking the polymer or a salt thereof with a crosslinking agent to form a cross-linked polymer or a salt thereof as a network on the porous support includes preparing a polymer solution comprising 1 (w/w) % to 10 (w/w) % of the polymer or a salt thereof and 0.1 (w/w) % to 1 (w/w) % of the crosslinking agent.

(32) In aspect (32) is presented the method of aspect (31), wherein the porous support is dip-coated, roller coated, spray coated, powder coated, or formulated with the polymer solution to form a coated porous support.

(33) In aspect (33) is presented the method of aspect (32), wherein the coated porous support is cured at a temperature of 50° C. to 150° C. to form a cured porous support.

(34) In aspect (34) is presented the method of aspect (32), wherein the coated porous support is cured at a temperature of 100° C. to 150° C. to form a cured porous support.

(35) In aspect (35) is presented the method of aspect (33) or (34), wherein the cured porous support is washed and/or dried to form the porous medium comprising the cross-linked polymer or a salt thereof thereon.

(36) In aspect (36) is presented a method of purifying a solution comprising a biomaterial, the method comprising contacting the solution with a porous medium of any one of aspects (1)-(24).

(37) In aspect (37) is presented the method of aspect (36), wherein the biomaterial comprises lentivirus, AAV capsid, or plasmid DNA.

(38) In aspect (38) is presented the method of aspect (36) or (37), wherein the biomaterial comprises lentivirus.

(39) In aspect (39) is presented the method of aspect (36) or (37), wherein the biomaterial comprises AAV capsid.

(40) In aspect (40) is presented the method of aspect (36) or (37), wherein the biomaterial comprises plasmid DNA.

(41) In aspect (41) is presented the method of any one of aspects (36)-(40), wherein the solution is passed through the porous medium in flow through mode.

(42) In aspect (42) is presented the method of aspect (41), wherein the flow through mode is a step elution.

(43) In aspect (43) is presented the method of aspect (41), wherein the flow through mode is a gradient elution.

(44) In aspect (44) is presented the method of any one of aspects (36)-(40), wherein the solution is passed through the porous medium in bind and elute mode.

EXAMPLES

These following examples further illustrate the invention but, of course, should not be construed as in any way limiting its scope.

Example 1

This example illustrates the preparation of a diethyl amino ethyl homopolymer, described herein, and as depicted in FIG. 1 where m and 1 are both 0 and n is a non-zero integer.

A 15.0 (w/w) % polymer solution was prepared by first dissolving diethylamino ethyl methacrylamide (37.5 g, 203.5 mmol) with deionized water (200.7 g). The pH of the solution was adjusted to 5.1 with acetic acid (10.4 g, 173.2 mmol). The solution was purged with nitrogen gas for 1 hour, followed by the addition of ammonium persulfate (1.4 g, 6.1 mmol). The temperature of the solution was increased to 65° C. and stirred for 16 hours. The experiment was repeated under similar conditions, and the resulting polymers were characterized by $H^1$-NMR spectroscopy and gas phase chromatograph (GPC). The $H^1$-NMR characterizations showed complete depletion of the monomer, and the GPC characterizations showed an average molecular weight range from 198-335 kDa.

Example 2

This example illustrates the preparation of a diethyl amino ethyl co-polymer, described herein, and as depicted in FIG. 1 where 1 is 0 and n and m are non-zero integers.

A 14.4 (w/w) % polymer solution was prepared by first dissolving diethylamino ethyl methacrylamide (16.0 g, 86.8 mmol) with deionized water (119.0 g). The pH of the solution was adjusted to 5.1 with acetic acid (4.4 g, 73.8 mmol). N-hydroxyethyl acrylamide (5.0 g, 43.4 mmol) was added to the solution. The solution was purged with nitrogen gas for 1 hour, followed by the addition of ammonium persulfate (0.9 g, 3.9 mmol). The temperature of the solution was increased to 65° C. and stirred for 16 hours. The resulting polymer was characterized by $H^1$-NMR spectroscopy and gas phase chromatograph (GPC). The $H^1$-NMR characterization showed complete depletion of the monomer, and the GPC characterization showed an average molecular weight of 351 kDa.

Example 3

This example illustrates the preparation of a diethyl amino ethyl co-polymer, described herein, and as depicted in FIG. 1 where n, m, and 1 are all non-zero integers.

A 15.1 (w/w) % polymer solution was prepared by first dissolving diethylamino ethyl methacrylamide (13.5 g, 73.3 mmol) with deionized water (122.8 g). The pH of the solution was adjusted to 5.1 with acetic acid (4.1 g, 67.6 mmol). N-(3-aminopropyl) methacrylamide hydrochloride (1.4 g, 7.9 mmol) was added to the solution, followed by the addition of N-hydroxyethyl acrylamide (7.9 g, 68.4 mmol). The solution was purged with nitrogen gas for 1 hour, followed by the addition of ammonium persulfate (1.04 g, 4.5 mmol). The temperature of the solution was increased to 65° C. and stirred for 16 hours. The experiment was repeated under similar conditions, and the resulting polymers were characterized by $H^1$-NMR spectroscopy and gas phase chromatograph (GPC). The $H^1$-NMR characterizations showed complete depletion of the monomer, and the GPC characterizations showed an average molecular weight range from 105-805 kDa.

Example 4

This example illustrates the preparation of a porous medium, described herein.

The 15.0 (w/w) % polymer solution from Example 1 (40.0 g) was diluted to 4.0 (w/w) % with deionized water (109.5 g) and 0.34 (w/w) % poly(ethylene glycol) diglycidyl ether (0.5 g). Polyethersulfone (PES) porous medium (0.8 μm rated) was dip-coated in the solution, then cured at 110° C. for 30 minutes. The medium was soaked in 65° C. deionized water for 1 hour, followed by an ambient deionized water rinse, and then dried at 90° C. for 1 hour. The experiment was repeated under similar conditions, and the resulting polymer uptakes were 4.8-17.7 (w/w) %.

Example 5

This example illustrates the preparation of a porous medium, described herein.

The 14.4 (w/w) % polymer solution from Example 2 (40.1 g) was diluted to 3.9 (w/w) % with deionized water (108.5 g) and 0.34 (w/w) % poly(ethylene glycol) diglycidyl ether (0.5 g). Polyethersulfone (PES) porous medium (0.8 μm rated) was dip-coated in the solution, then cured at 110° C. for 30 minutes. The medium was soaked in 65° C. deionized water for 1 hour, followed by an ambient deionized water rinse, and then dried at 90° C. for 1 h. The polymer uptake was 17.7 (w/w) %.

Example 6

Figure 2:
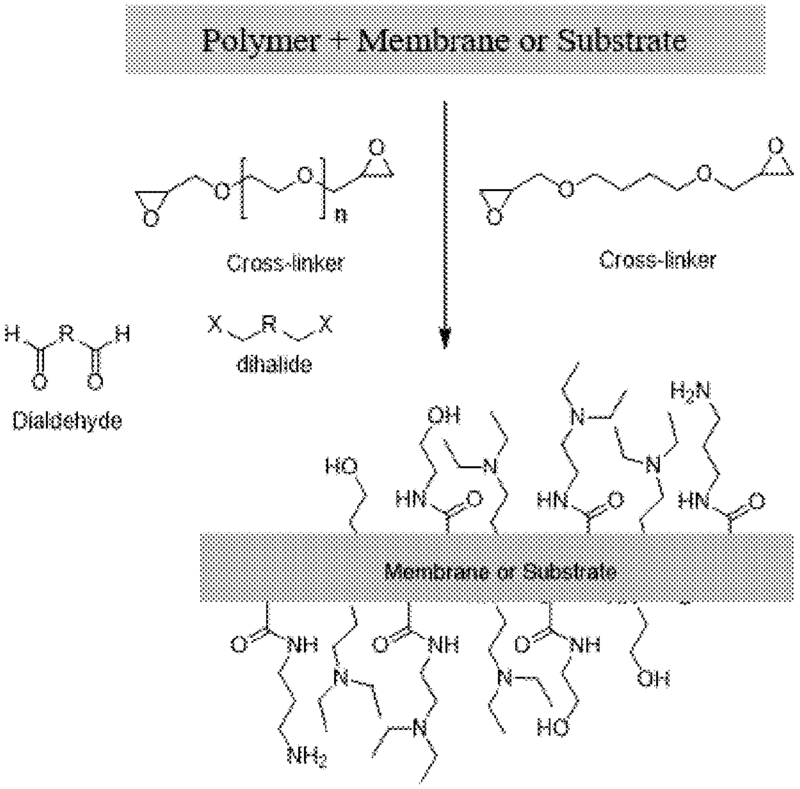
FIG. 2 shows the preparation of an exemplary porous medium described herein.

This example illustrates the preparation of a porous medium, described herein, and as depicted in FIG. 2.

Figure 3:
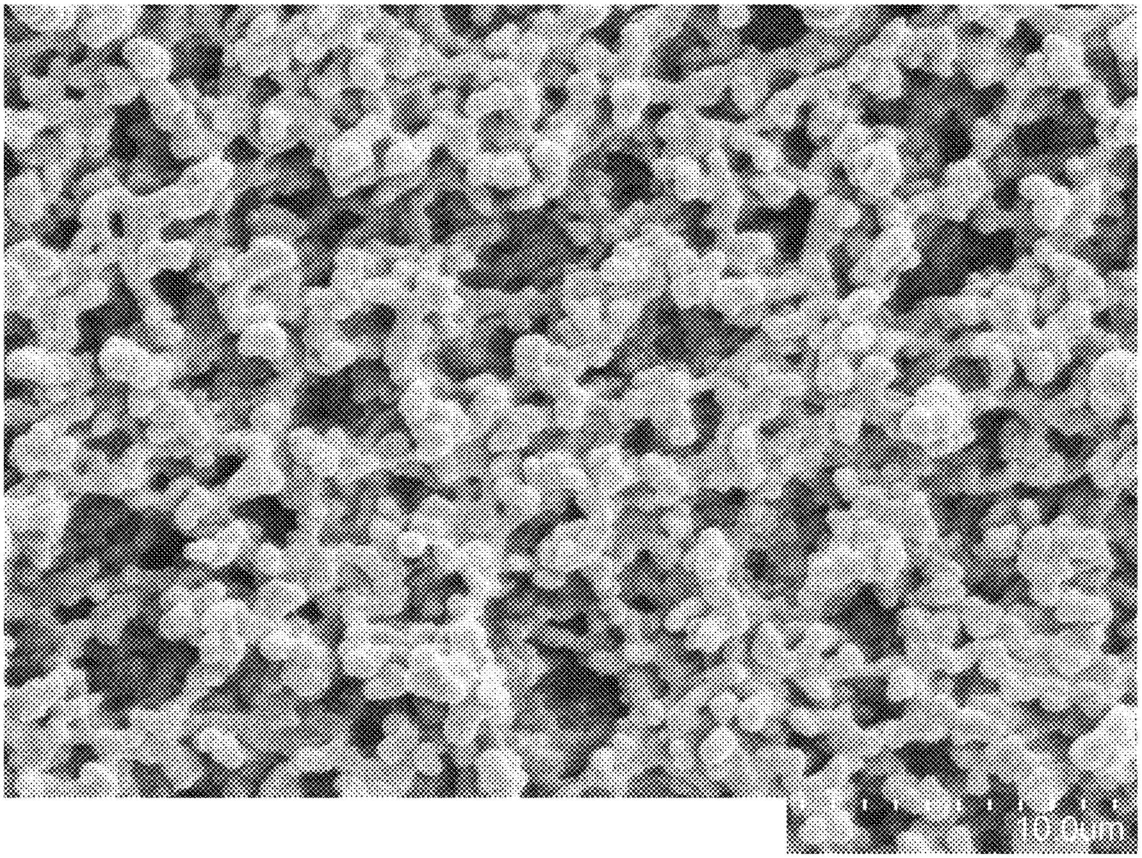
FIG. 3 provides a scanning electron microscope surface image of a DEAE-based membrane.

The 15.1 (w/w) % polymer solution from Example 3 (40.1 g) was diluted to 4.1 (w/w) % with deionized water (109.5 g) and 0.34 (w/w) % poly(ethylene glycol) diglycidyl ether (0.5 g). Polyethersulfone (PES) porous medium (0.8 μm rated) was dip-coated in the solution, then cured at 110° C. for 30 minutes. The medium was soaked in 65° C. deionized water for 1 hour, followed by an ambient deionized water rinse, and then dried at 90° C. for 1 hour. The experiment was repeated under similar conditions, and the resulting polymer uptakes were 10.0-21.1 (w/w) %. An exemplary scanning electron microscope surface image of the resulting DEAE-based membrane is shown in FIG. 3.

Example 7

This example illustrates bovine serum albumin (BSA) Bind and Elute Purification using porous media, described herein.

Polymer-coated porous media from Examples 4-6 were loaded to 10% breakthrough with BSA (0.5 mg/mL) in 25 mM Tris buffer at pH 8 and 3 mS/cm conductivity, and then washed in the same buffer. The bound BSA was eluted with 1 M NaCl in 25 mM Tris at pH 8. The dynamic binding capacity ranged from 57-118 mg/mL of membrane volume with a recovery yield of 91-100%.

Example 8

This example illustrates the Bind and Elute Purification of plasmid DNA using porous media, described herein.

Polymer-coated porous media from Examples 4-6 were loaded to 10% breakthrough with pDNA (4.5 kb, 0.1 mg/mL) in 50 mM Tris with 10 mM EDTA and 0.2 M NaCl at pH 7.2. The media were washed in 50 mM Tris with 10 mM EDTA and 0.5 M NaCl at pH 7.2. The pDNA was then eluted in 50 mM Tris with 10 mM EDTA and 1 M NaCl at pH 7.2. The dynamic binding capacity was 25 mg/mL of membrane volume with a recovery yield of 68-71%.

Example 9

This example illustrates the Bind and Elute Purification of Lentivirus using a porous medium, described herein.

Polymer-coated porous media from Examples 4-6 were loaded with a solution of Lentivirus titer ($1e^9$ TU/$6e^{11}$ VP) in 50 mM Tris with 0.13 M NaCl at pH 7.4, and then washed with the same buffer and step eluted at 0.20 M, 0.46 M, 0.65 M, 1.00 M, and 1.30 M NaCl. The elution fractions collected had a p24 yield from 31-73% and an infectious yield of 10-13%.

Example 10

This example illustrates the separation of full and empty AAV5 capsids using a porous medium, described herein.

The polymer-coated porous media from Example 6 were loaded with a titer of full and empty AAV5 capsids ($10^{11}$-$10^{13}$ VP/ml) in 25 mM Tris with 1 mM $MgCl_2$ at pH 8 and 3 mS/cm conductivity, and then washed with the same buffer and eluted with 0.2 M NaCl in 25 mM Tris with 10 mM $MgCl_2$ at pH 8 using a step elution of 1 mS/cm. Two distinct elution peaks were observed. For the collected fractions corresponding to Peak 1 (5 mS/cm conductivity), the A260/A280 ratio was 0.66, indicating predominantly empty capsids. For the collected fractions corresponding to Peak 2 (6 mS/cm conductivity), the A260/A280 ratio was 1.3, indicating an enrichment of full capsids.

Example 11

This example illustrates the separation of full and empty AAV9 capsids using a porous medium, described herein.

Polymer-coated porous media from Examples 4-6 were loaded with a standard titer of ≥80% full AAV9 capsids ($10^{11}$-$10^{13}$ VP/ml) in 25 mM Tris with 1 mM $MgCl_2$ at pH 7.0 and 3 mS/cm conductivity, and then washed with the same buffer and step eluted at 1 mS/cm increments in 0.2 M NaCl in 25 mM Tris with 10 mM $MgCl_2$ at pH 7.0. The collected flowthrough fractions were 62-70% full capsids.

A standard titer of empty AAV9 capsids in the same buffer was loaded onto the porous media and washed in the same buffer. The empty capsids were then step eluted at 1 mS/cm increments in 0.2 M NaCl in 25 mM Tris with 10 mM $MgCl_2$ at pH 7.0. The collected flowthrough and elution fractions were 16-59% empty capsids.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A porous medium comprising (i) a porous support and (ii) a polymer or a salt thereof, wherein the polymer or a salt thereof comprises polymerized monomer (A), polymerized monomer (B), and polymerized monomer (C), wherein monomer (A) is of formula (I):

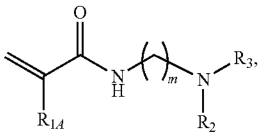

monomer (B) is of formula (II):

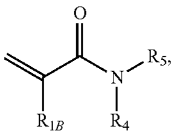

and monomer (C) is of formula (III):

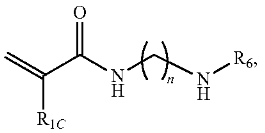

wherein $R_{1A}$, $R_{1B}$, and $R_{1C}$ are each independently hydrogen or methyl, $R_2$ and $R_3$ are each independently a $C_{1-5}$ alkyl group, a $C_{1-5}$ heteroalkyl group, or $R_2$ and $R_3$ are combined to form a 5- or 6-membered ring containing 3 to 5 carbon atoms, $R_4$ and $R_5$, are each independently hydrogen, a substituted or unsubstituted $C_{1-8}$ alkyl group, $C_{2-8}$ alkenyl group, $C_{2-8}$ alkynyl group, $C_{1-8}$ heteroalkyl group, $C_{3-8}$ cycloalkyl group, $C_{3-8}$ heterocycloalkyl group, aryl group, heteroaryl group, an alkaryl group, or an arylalkyl group, $R_6$ is hydrogen, a substituted or unsubstituted $C_{1-8}$ alkyl group, aryl group, heteroaryl group, an alkaryl group, or an arylalkyl group, m and n are each independently an integer from 1 to 4, wherein the polymer or a salt thereof is crosslinked with a crosslinking agent to form a network on the porous support.

2. The porous medium of claim 1, wherein $R_{1A}$, $R_{1B}$, and $R_{1C}$ are each hydrogen.

3. The porous medium of claim 1, wherein $R_{1A}$, $R_{1B}$, and $R_{1C}$ are each methyl.

4. The porous medium of claim 1, wherein $R_2$ and $R_3$ are each independently $C_{1-5}$ alkyl group.

5. The porous medium of claim 1, wherein $R_4$ and $R_5$ are each independently hydrogen, a substituted or unsubstituted $C_{1-8}$ alkyl group, $C_{1-8}$ heteroalkyl group, $C_{3-8}$ cycloalkyl group, aryl group, an alkaryl group, or an arylalkyl group.

6. The porous medium of claim 1, wherein $R_6$ is hydrogen or a substituted or unsubstituted $C_{1-8}$ alkyl group.

7. A method of preparing a porous medium of 1, the method comprising:

(i) polymerizing a monomer mixture comprising monomer (A) of Formula (I), monomer (B) of Formula (II), and monomer (C) of Formula (III) to obtain a polymer or salt thereof comprising polymerized monomer (A), polymerized monomer (B), and polymerized monomer (C) and (ii) crosslinking the polymer or a salt thereof with a crosslinking agent to form a crosslinked polymer or a salt thereof as a network on the porous support.

8. A method of purifying a solution comprising a biomaterial, the method comprising contacting the solution with a porous medium of claim 1.

9. The method of claim 8, wherein the biomaterial comprises lentivirus, AAV capsid, or plasmid DNA.

* * * * *